United States Patent
Lewallen et al.

(10) Patent No.: US 6,296,273 B1
(45) Date of Patent: Oct. 2, 2001

(54) AUTOMOBILE AIRBAG DEACTIVATION SYSTEM

(76) Inventors: David G. Lewallen; Richard J. Lovett, both of c/o 1220 7$^{th}$ St. SW., Rochester, MN (US) 55902

(*) Notice: Subject to any disclaimer, the term of this patent is extended or adjusted under 35 U.S.C. 154(b) by 0 days.

(21) Appl. No.: 09/507,963

(22) Filed: Feb. 22, 2000

(51) Int. Cl.$^7$ ............................................. B60R 21/01
(52) U.S. Cl. ............................ 280/735; 701/45; 701/47
(58) Field of Search ........................... 280/735; 701/45, 701/47

(56) References Cited

U.S. PATENT DOCUMENTS

| | | |
|---|---|---|
| 3,629,816 | 12/1971 | Gillund . |
| 4,163,268 | 7/1979 | Spies et al. . |
| 4,222,030 | 9/1980 | Yasui et al. . |
| 4,346,913 | 8/1982 | Schrauf et al. . |
| 4,641,041 | 2/1987 | Mattes et al. . |
| 4,804,859 | 2/1989 | Swart . |
| 4,933,570 | 6/1990 | Swart et al. . |
| 4,938,504 * | 7/1990 | Fukada et al. .................... 280/731 |
| 4,950,914 | 8/1990 | Kurihara et al. . |
| 5,038,134 | 8/1991 | Kondo et al. . |
| 5,146,104 | 9/1992 | Schumacher et al. . |
| 5,158,323 | 10/1992 | Yamamoto et al. . |
| 5,161,820 | 11/1992 | Vollmer . |
| 5,234,228 | 8/1993 | Morota et al. . |
| 5,324,074 | 6/1994 | Christian et al. . |
| 5,331,211 | 7/1994 | Kondo et al. . |
| 5,343,394 | 8/1994 | Takeuchi et al. . |
| 5,404,128 | 4/1995 | Ogino et al. . |
| 5,530,649 * | 6/1996 | Fujishima .................... 364/424.05 |
| 5,544,914 * | 8/1996 | Borninski et al. ................ 280/735 |
| 5,683,103 * | 11/1997 | Blackburn et al. ............... 280/735 |
| 5,690,356 * | 11/1997 | Lane, Jr. ........................ 280/735 |
| 5,712,784 * | 1/1998 | Fendt et al. ................... 364/424.055 |
| 5,742,916 | 4/1998 | Bischoff et al. . |
| 5,783,871 * | 7/1998 | LeMense ........................ 307/710.1 |
| 5,802,479 | 9/1998 | Kithil et al. . |
| 5,816,611 * | 10/1998 | Parn ............................ 280/734 |
| 5,848,802 * | 12/1998 | Breed et al. .................... 280/735 |

(List continued on next page.)

FOREIGN PATENT DOCUMENTS

| | | |
|---|---|---|
| 42 43 826 A 1 | 6/1994 | (DE) . |
| 43 27 341 A 1 | 2/1995 | (DE) . |
| 44 26 677 A 1 | 2/1995 | (DE) . |
| 197 47 708 A 1 | 3/1999 | (DE) . |
| 0 719 681 A1 | 7/1996 | (EP) . |

*Primary Examiner*—Eric Culbreth
*Assistant Examiner*—Deanna L. Draper
(74) *Attorney, Agent, or Firm*—Patterson, Thuente, Skaar & Christensen, P.A.

(57) ABSTRACT

An automobile airbag deactivation system is provided to enable emergency services personnel to prevent uninflated airbags from inflating when crash victims are being extricated from crashed automobiles. The system would enable emergency services personnel to deactivate all airbag inflation systems. The airbag deactivation system includes an interrupt switch and a switch control. The interrupt switch is located so as to prevent airbag inflation, such as between the airbag control circuitry and the airbag actuator or between the airbag actuator and the airbag. The switch control includes a device to open the interrupt switch and an access control device. The access control device prevents deactivation of the airbag inflating system by non-emergency personnel. Embodiments of the access control device include restricted electromagnetic band communication between a signal source and a signal transducer. The transducer opens the interrupt switch to deactivate the airbag inflation system. In other embodiments, a mechanical lock is used. Keys to these locks may be made available to emergency services personnel.

8 Claims, 2 Drawing Sheets

U.S. PATENT DOCUMENTS

| | | | |
|---|---|---|---|
| 5,851,025 | * 12/1998 | Gamboa | 280/735 |
| 5,866,954 | * 2/1999 | Daniel et al. | 307/10.1 |
| 5,871,229 | 2/1999 | Saito . | |
| 5,882,034 | 3/1999 | Davis et al. . | |
| 5,908,481 | 6/1999 | Siddiqui . | |
| 5,915,725 | * 6/1999 | Cuddihy et al. | 280/735 |
| 5,927,752 | 7/1999 | Brandin . | |
| 5,964,815 | * 10/1999 | Wallace et al. | 701/45 |
| 5,975,568 | 11/1999 | Speckhart et al. . | |
| 5,992,879 | * 11/1999 | Bogge | 280/735 |
| 5,997,033 | * 12/1999 | Gray et al. | 280/735 |
| 5,999,871 | 12/1999 | Liu . | |
| 6,007,088 | 12/1999 | Yamamoto et al. . | |
| 6,007,093 | 12/1999 | Bechtle et al. . | |
| 6,010,146 | 1/2000 | Otsuka et al. . | |
| 6,010,152 | 1/2000 | Swann et al. . | |
| 6,012,738 | 1/2000 | Beisswenger . | |
| 6,014,602 | 1/2000 | Kithil et al. . | |
| 6,026,340 | * 2/2000 | Corrado et al. | 701/47 |
| 6,113,139 | * 9/2000 | Heximer et al. | 280/735 |
| 6,142,513 | * 11/2000 | Schoos et al. | 280/735 |
| 6,152,483 | * 11/2000 | Quigley | 280/735 |

* cited by examiner

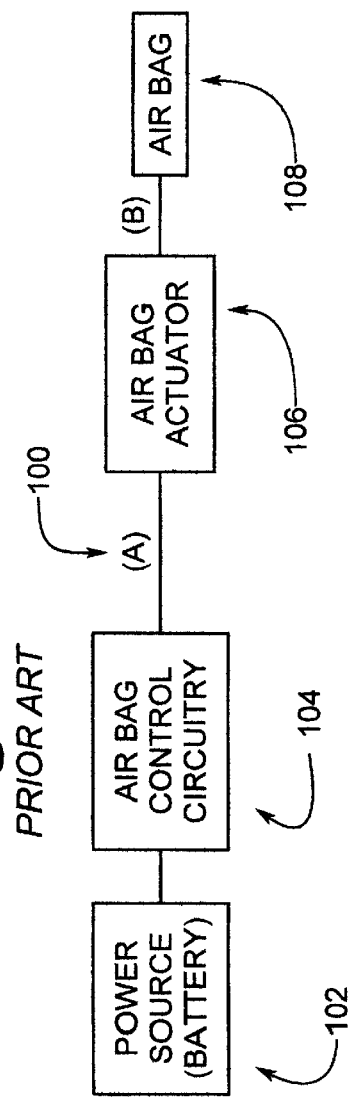
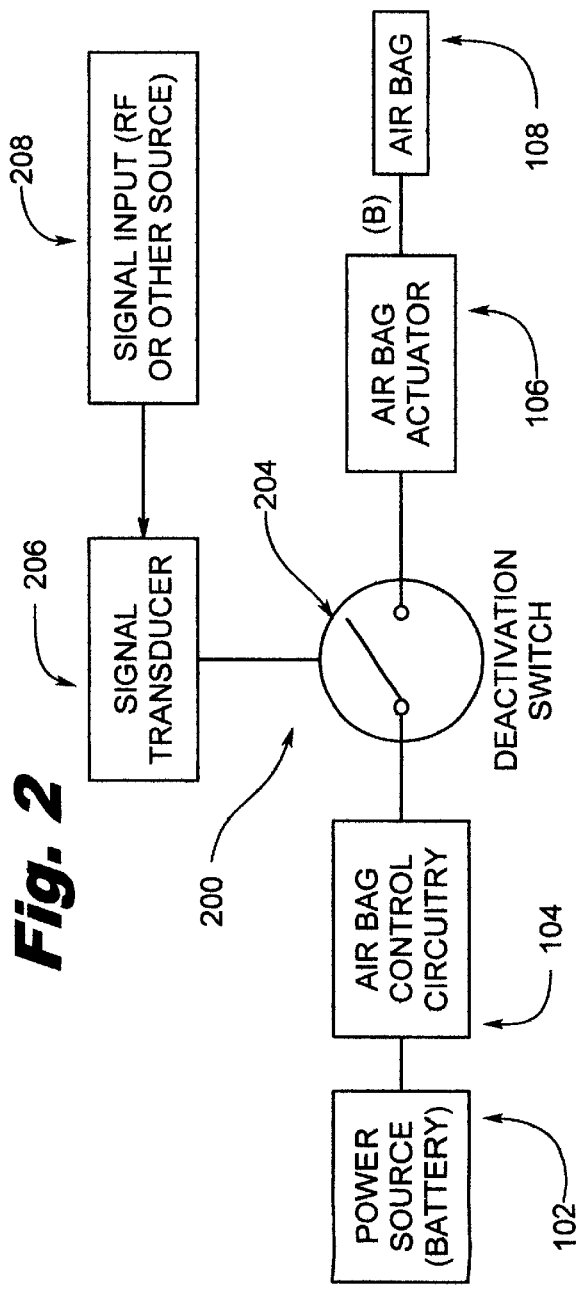

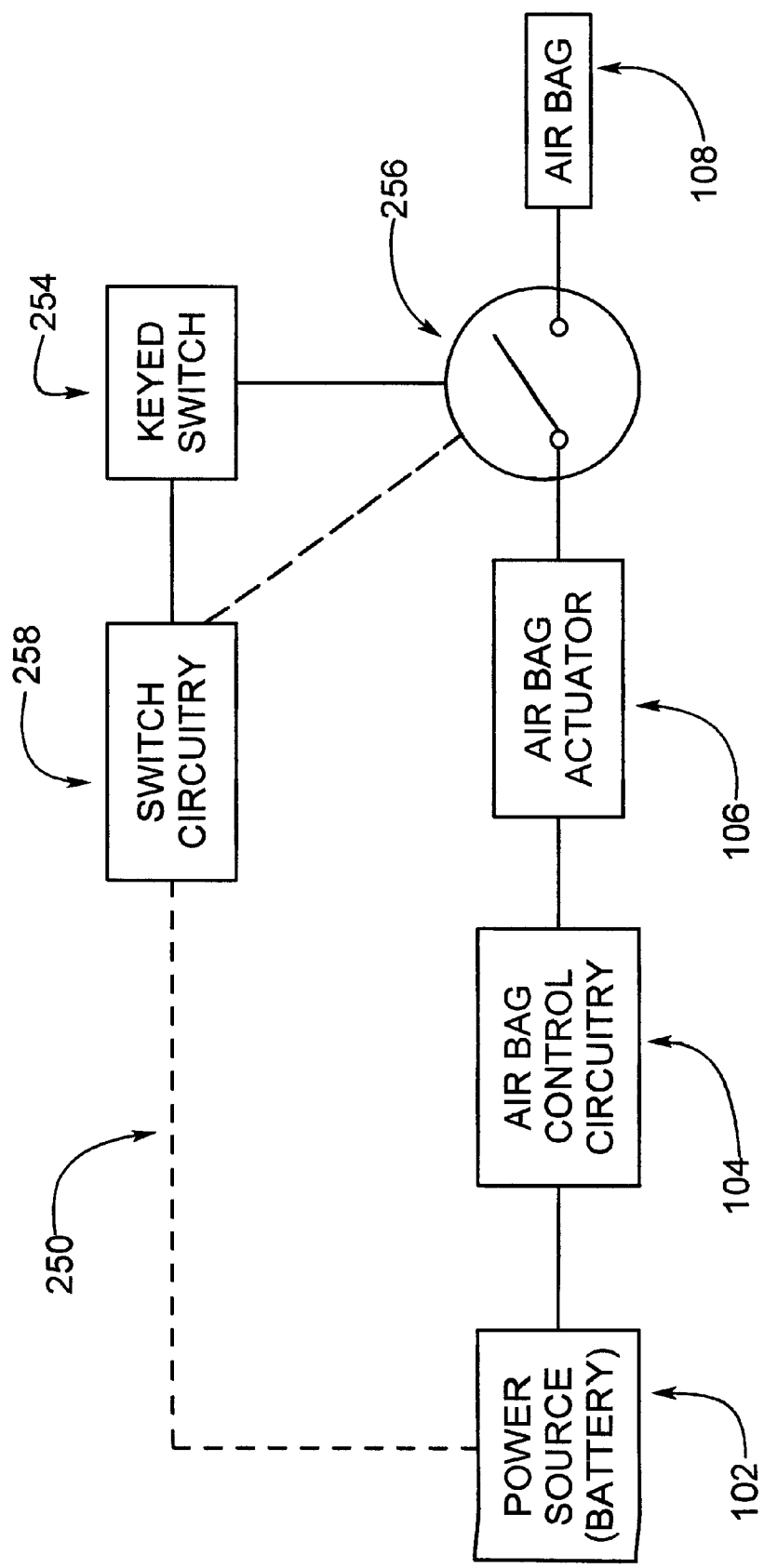

AUTOMOBILE AIRBAG DEACTIVATION SYSTEM

BACKGROUND OF THE INVENTION

1. Field of the Invention

This invention relates to automotive airbags and, in particular, this invention relates to devices and systems for deactivating airbags by emergency services personnel.

2. Background of the Invention

The presence of airbags in vehicles is a safety feature which has greatly reduced the fatalities and injuries caused by crashes. Worldwide, it has been estimated that about one-half million persons are killed and about 5 million persons are severely injured by motor vehicle accidents annually. In the United States, frontal airbags were required in all light vehicles sold after Sep. 1, 1998 to protect drivers and front passengers. Automobile makers began installing side impact airbags in approximately 1994. These side impact airbags are currently present in about 15%–35% of new light vehicles. Worldwide utilization of airbag technology is presently estimated at not more than 25% for driver airbags and 15% for passenger-side airbags. However, airbag manufacturing industry estimates project dramatic growth in the use of airbags over the next decade. For the year 2000, it is estimated that front impact airbags may be installed in over 80 million units and side impact airbags may be installed in more than 35 million units.

Following motor vehicle crashes, vehicular airbags usually deploy, thereby protecting the vehicle occupants from injury. However, vehicle airbags may fail to deploy during crashes for several reasons. Therefore, the increasing numbers of vehicles with airbags and the increasing numbers of airbags present in vehicles pose an increasingly grave and potentially fatal hazard to crash victims and rescue personnel when one or more vehicular airbags fail to deploy during a crash. These airbags may then inflate when emergency services personnel are extricating crash victims from cars, thereby injuring emergency services personnel and further injuring the crash victims. Thus, an ongoing and urgent need exists to enable emergency services personnel to dependably and safely deactivate undeployed airbags during the course of rescue operations. To this end, procedures have been developed to physically deactivate airbags in vehicles after accidents. However, the increasing number of airbags present in vehicles and the wide variety of airbag designs and placement (evermore frequently at multiple points within the same vehicle), tend to make the task of safely disarming these devices in vehicles an almost impossible undertaking. There is thus a need for a standardized, dependable, and universal method to deactivate undeployed airbags prior to extricating injured accident victims.

SUMMARY OF THE INVENTION

The present airbag deactivation system substantially fulfills the aforementioned needs of the industry by providing a system for deactivating an automotive airbag inflating system. One embodiment of the present deactivating system includes an interrupt switch and a switch control. The interrupt switch may be operably proximate the airbag inflating system and may be configured to prevent the airbag from being inflated when opened. The switch control may be configured to open the interrupt switch and may include an access control device for preventing the switch from being opened by non-emergency personnel. The access control device may include electromagnetic sending and receiving equipment or may be mechanical in nature. The electromagnetic signals may be controlled, restricted signal pulse patterns or frequencies to prevent inadvertent deactivation. The mechanical access control embodiments may include locks or the like. The interrupt switch may be located so as to intercept electronic signals from the airbag control circuitry, the airbag actuator, or both. The interrupt switch is opened to intercept electronic signals from the airbag control circuitry or the airbag actuator. If the present airbag deactivation system uses an electromagnetic signal, a second signal may be used to reactivate airbag inflation systems in the vicinity by closing the interrupt switches.

It is an object of the present invention to provide a uniform means for deactivating airbag inflating systems to enable emergency services personnel to prevent uninflated airbags from inflating when crash victims are being extricated from automobiles.

It is another object of the present invention to provide an airbag deactivation system which may be incorporated into any airbag inflation system.

It is still another object of the present invention to provide an airbag deactivation system which may be universally utilized by emergency services personnel to quickly and effectively deactivate airbag inflation systems prior to extricating crash victims from vehicles.

It is yet another object of the present invention to provide an airbag deactivation system which can reactivate deactivated airbag inflation systems once crash victims are extricated.

These and other advantages of the present invention will become apparent as this invention is more fully explained below.

BRIEF DESCRIPTION OF THE DRAWINGS

FIG. 1 depicts a diagram of an automobile airbag inflation system of the prior art;

FIG. 2 depicts a diagram of a first embodiment of the airbag deactivation system of this invention; and FIG. 3 depicts a diagram of a second embodiment of the present airbag deactivation system.

DETAILED DESCRIPTION OF THE PREFERRED EMBODIMENT

The present invention provides a dependable and safe method to deactivate undeployed or uninflated automobile airbags after a crash, thereby protecting occupants and emergency services personnel. In one embodiment, the present invention deactivates these devices in a uniform and universal method regardless of vehicular make or model. This invention greatly facilitates the safety of rescue efforts and eliminates the need for specific, detailed knowledge of airbag placement and deploying technology—placement and technology often specific to automotive make and model—during these critical, time-urgent rescue procedures.

FIG. 1 graphically depicts a typical airbag deploying system of the prior art generally at 100. The prior art airbag system 100 includes a power source 102, airbag control circuitry 104, an airbag actuator 106, and one or more airbags 108. The airbag control circuitry 104 obtains electrical power from the power source 102 which is usually the automotive battery. The airbag control circuitry 104 includes sensors to detect impacts and associated circuitry and logic to initiate airbag inflation in response to an impact. Upon detecting an impact to the vehicle, the sensors send a signal to a logic unit in the airbag control circuitry 104. The signal from the sensors causes the logic unit in the airbag control circuitry to activate the airbag actuator 106. The airbag actuator 106 then inflates the airbag 108. The airbag control circuitry and the airbag actuator may operate using power directly from the power source 102. In addition, the airbag control circuitry and/or airbag actuator may include alternate power sources, such as capacitors, so that the airbags will be inflated whether or not power from the power source is interrupted as a result of the impact. Exemplary airbag systems are disclosed in U.S. Pat. Nos. 5,882,034 and 5,158,323. Exemplary airbag control circuitry is disclosed in U.S. Pat. Nos. 3,629,816; 4,163,268; 4,222,030; 4,804,859; 4,933,570; 4,950,914; 5,038,134; 5,146,104; 5,331,211; 5,343,394; 5,742,916; and 5,999,871. Related disclosures arc contained U.S. Pat. Nos. 4,346,913; 4,641,041; 5,404,128; 5,802,479; 5,927,752; 5,975,568; and 6,014,602. Disclosures relating to airbag activators and airbags in general may be found in U.S. Pat. Nos. 5,871,229; 5,908,481; 6,007,088; 6,010,146; 6,010,152; and 6,012,738. The entire disclosures of these patents are hereby incorporated by reference.

One embodiment of the present airbag deactivation system is depicted in FIG. 2 generally at 200. The present airbag deactivation system includes a deactivation (interrupt) switch 204, a switch control such as a signal transducer 206 and an access control device such as a signal source (input) 208. The access control device prevents the switch from being opened by non-emergency personnel. In this embodiment, the deactivation switch 204 is interposed between the airbag control circuitry 104 and the airbag activator 106 depicted at "A" in FIG. 1. The signal source 208 may be activated to output an electromagnetic signal when emergency services personnel desire to ensure that undeployed airbags will not be inflated during an extrication procedure. Exemplary wireless electromagnetic input may include radio frequency, infrared, microwave, very high frequency, ultra high frequency, magnetic, or the like. The wireless signal may be a controlled pulse pattern and/or restricted emergency frequency or signal input accessible only to emergency services personnel. The controlled and restricted signal pulse pattern and/or frequency would prevent airbag deactivation by other communication and electronic devices or by non-emergency personnel. The signal source 208 may also generate a second electromagnetic signal to reactivate airbag deployment systems after a rescue procedure has been completed. The second reactivating signal would be useful in situations where a rescue (extrication) procedure had been completed and the emergency personnel wanted to ensure that airbags in other vehicles in the vicinity would deploy in the event of a later accident.

The signal transducer 206 would receive the deactivation signal and open the switch 204 in response. The open switch 204 would prevent the airbag control circuitry from activating the airbag actuator, thereby preventing the airbag 108 from being inflated. Upon receipt of the reactivation signal from the signal source 208, the signal transducer would close the deactivation switch 204 to allow for normal airbag inflation. It is contemplated that the signal source 208 would also include an alarm or reminder circuit to remind emergency services personnel to reactivate airbag inflation systems before leaving the accident site. In some airbag systems, it may be necessary to locate the deactivation switch 204 between the airbag actuator and the airbags ("B" in FIG. 1). Transmitters transmitting the deactivation (and perhaps reactivation) signals may be provided to all emergency personnel potentially involved in extrication protocols.

FIG. 3 shows a second embodiment of the present airbag deactivation system generally at 250. The airbag deactivation system 250 includes an access control device such as a keyed switch 254, an interrupt switch such as deactivation switch 256, and optional switch circuitry 258. The keyed switch 254 may be located at one or more sites on a vehicle, e.g., proximate a rear license plate mount. Keys to the switch 254 could be made available to the above-described emergency personnel. The keyed switch 254 may directly open the switch 256, thereby preventing the airbag 108 from inflating. Alternatively, keyed switch 254 may activate switch circuitry 258, which would open the deactivation switch 256. The switch circuitry 258 is contemplated to include an emergency power source such as one or more capacitors to open the switch 256 in the event that power was interrupted from the power source 102. It is further contemplated that a plurality of keyed switches 254 may be present at various sites on vehicles so that at least one keyed switch would be accessible in a crashed vehicle. The embodiment in FIG. 3 depicts the deactivation switch as being located between the airbag activator and the airbag (site "B" of FIG. 1). However, the deactivation switch 256 may also be located to intercept a signal between the airbag control circuitry 104 and the airbag activator 106 (site "A" of FIG. 1) as well. It is contemplated that deactivation switches 204 and 256 may be located both between the airbag control circuitry and the airbag activator and between the airbag activator and the airbag in situations where it is deemed necessary or advisable for a double intercept.

Because numerous modifications of this invention may be made without departing from the spirit thereof, the scope of the invention is not to be limited to the embodiments illustrated and described. Rather, the scope of the invention is to be determined by the appended claims and their equivalents.

What is claimed is:

1. A system for deactivating an automotive airbag inflating system in an automobile, the automotive airbag inflating system comprising airbag control circuitry, an airbag actuator, and an airbag, the deactivating system comprising:

an interrupt switch operably proximate the airbag inflating system and configured to prevent the airbag from being inflated when opened; and a switch control configured to open the interrupt switch, the switch control including a transponder and a signal source, the transponder in electronic communication with the interrupt switch, the signal source external to the automobile and emitting an electromagnetic signal, the transponder receiving the emitted electromagnetic signal and opening the interrupt switch in response to the received electromagnetic signal.

2. The deactivating system of claim 1, in which the electromagnetic signal is selected from the group consisting of infrared radiation, radio frequency radiation, very high frequency radiation, ultra high frequency radiation, an electromagnetic field, and any combination thereof.

3. The deactivating system of claim 1, in which the interrupt switch is configured to interrupt electrical communication between the airbag control circuitry and the airbag actuator.

4. The deactivating system of claim 1, in which the interrupt switch is configured to interrupt electrical communication between the airbag actuator and the airbag.

5. A method of extracting a person from an automobile with an airbag inflation system, the airbag inflation system comprising:

an airbag control circuitry, an airbag actuator, an airbag, an interrupt switch, and a switch control, the airbag control circuitry activating the airbag actuator in response to an impact sustained by the vehicle, the activated airbag actuator inflating the airbag, the interrupt switch operably proximate the airbag inflation system and configured to prevent the airbag from being inflated when the interrupt switch is in an open position, the switch control including a signal source and a transponder, the signal source emitting an electromagnetic signal, the transponder receiving the emitted electromagnetic signal and opening the interrupt switch in response to said received electromagnetic signal, the method comprising:
actuating the signal source to emit the electromagnetic signal, said electromagnetic signal being received by the transponder, the transponder opening the interrupt switch in response to the received electromagnetic signal; and
extracting the person from the automobile.

6. The method of claim 5, in which actuating the signal source comprises sending an electromagnetic signal selected from infrared radiation, radio frequency radiation, very high frequency radiation, ultra high frequency radiation, an induced electromagnetic field, and any combination thereof.

7. The method of claim 5, the interrupt switch configured to interrupt electrical communication between the airbag control circuitry and the airbag actuator, and
in which a signal from the airbag control circuitry to the airbag actuator is interrupted when the signal source is actuated.

8. The method of claim 5, the interrupt switch configured to interrupt electrical communication between the airbag actuator and the airbag, and
in which a signal from the airbag actuator to the airbag is interrupted when the signal source is actuated.

* * * * *